March 31, 1970 R. R. STRACK 3,503,116

METHOD OF FABRICATING A PRESSURE TRANSDUCER

Filed Oct. 9, 1967

INVENTOR
RICHARD R. STRACK

BY *Stowell & Stowell*

ATTORNEYS.

United States Patent Office

3,503,116
Patented Mar. 31, 1970

3,503,116
METHOD OF FABRICATING A
PRESSURE TRANSDUCER
Richard R. Strack, Sturbridge, Mass., assignor to The Bendix Corporation, Detroit, Mich., a corporation of Delaware
Filed Oct. 9, 1967, Ser. No. 673,578
Int. Cl. H04r 31/00
U.S. Cl. 29—423          4 Claims

ABSTRACT OF THE DISCLOSURE

The transducer is fabricated by depositing a thin coating of light reflecting material on a flat, polished surface of a substrate consisting of a mosaic comprising a glass core or cores encased by a glass casing or matrix of different etching properties than the glass cores. After coating, the core or cores are removed from the substrate by etching to furnish an edge-supporting membrane or membranes consisting of residual coating in the area from which the cores are removed. The light transmitting and receiving fibers are formed from a bundle of optical fibers suitably arranged and encased in a matrix of glass having different etching properties than those of the fibers. The bundles are fixed in the openings formed by removal of the cores. The matrix encasing the fibers is removed by etching, and the respective fibers are then segregated by size and connected to a source of light or to the sensing device, as appropriate.

BACKGROUND OF THE INVENTION

This invention relates generally to pressure transducers and, more particularly, to a flexible diaphragm pressure transducer utilizing light reflected therefrom to measure the deflection and therefore the pressure acting thereon.

Pressure transducers of the general type to which this invention pertains are known in the art and generally consist of thin-film diphragms having a reflective surface thereto. The diaphragms generally comprise an elastic member mechanically formed by extrusion, calendering or like processes. The reflective surface is usually in the form of a coating formed on the diaphragm. A source of light is provided to transmit light to the diaphragm for reflection thereby. Means are provided for directing light reflected from the diaphragm to a device such, for example, as a photodetector, to convert the motion of the diaphragm to sound, electrical impulses, or other similar recording means through the brightness fluctuations caused by the change in intensity of the reflected light.

Transducers such as these find great utility in systems for measuring pressure differences or fluctuations, high sensitivity microphones for uses such as listening devices and the like.

The prior art devices have heretofore been limited in sensitivity by the physical limitations of membranes, reflective coating thickness, and cost of fabrication.

Because of mechanical formation of the diaphragm, the attainment of suitable thinness for high sensitivity and consistent property over the surface area thereof has been relatively costly. The additional thickness required by the coating of reflective material has provided a further handicap insofar as high sensitivity is concerned. Furthermore, due to the nature of formation of the diaphragm and reflective surface, the choice of materials available has been limited to those which may be readily worked by the prior art methods.

SUMMARY OF THE INVENTION

This invention provides a novel pressure transducer which avoids the disadvantages of the prior art by providing a relatively simple and inexpensive means to form a thin pressure sensitive diaphragm greatly improved over the prior art devices.

The invention also provides a device wherein a highly sensitive multiple membrane pressure transducer may be fabricated at minimal cost and complexity by utilizing fiber optic techniques in the fabrication thereof.

The invention further provides a novel method of fabricating a pressure transducer with a thin combination diaphragm-reflective surface formed homogeneously by furnishing means to form a diaphragm of vitreous material.

In a preferred embodiment, the invention consist of forming a substrate from transverse wafers sliced from a matrix-bound bundle of optical fibers with etching properties different than the matrix produced in accordance with complex fiber optic methods. A thin coating is formed on a polished surface of the matrix and the fibers are etched therefrom, to provide free standing membranes at the points where the fibers are removed from the support of the coating. Bundles of fibers comprising a light transmitting fiber surrounded by light receiving fibers are centered in each recess left by removal of the fibers and light is directed onto the membranes for reflection thereby. Light sensing means are connected to the light receiving fibers and deflection of the membrane under pressure is sensed by monitoring the quantity of light transmitted to the sensing device through the light receiving fibers as the angle of reflection changes with deflection of the membrane.

These and other objects of the invention will become better understood by those skilled in the art by reference to the following detailed description wherein like components throughout the figures thereof are indicated by like numerals and wherein:

DESCRIPTION OF THE PREFERRED EMBODIMENT

As employed hereinafter, the term "glass" is used in its generic sense and is intended to include all inorganic vitreous compositions and, where applicable, other materials having similar properties for the purposes set forth.

Figure 1:
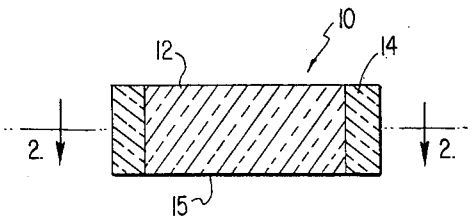
FIGURE 1 is an elevational sectional view through a device comprising a single cell in accordance with the invention during a preliminary stage of fabrication thereof.
Figure 2:
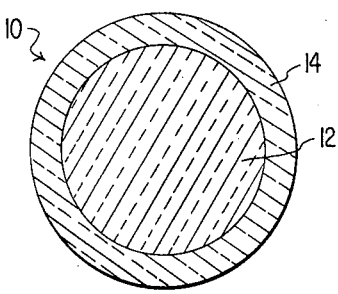
FIGURE 2 is a sectional view of the cell of FIGURE 1 taken along the line 2—2 thereof.

In FIGURES 1 and 2, an initial substrate, indicated generally at 10, comprises a glass core 12 encased in a glass cladding 14. Although the illustration of FIGURE 1 is directed to a single cell, it is contemplated that the substrate 10 can also comprises a plurality of adjacent cores interconnected by cladding prepared, for example, by the method disclosed in United States Patent No. 3,294,504 issued Dec. 27, 1966 to Hicks. In that patent, a highly etchable glass rod is clad with a glass tube having a lower rate of etching than the rod. The cladding is accomplished by drawing the rod and tube progressively through a heated zone to form a composite fiber. For single-cell devices, the composite fibers may be cut transversely into wafers to form the substrate with the rod forming the core 12 and the tube forming the cladding 14. For multiple-cell substrates, the composite fiber is cut, stacked and, if smaller diameter fibers are desired, redrawn through heated zones to form a multiple fiber of the required fiber density fused together by a matrix formed by the tubes. The redrawn multiple fibers are then cut transversely in predetermined lengths, stacked upon one another, and the stacked multiple fibers are placed in, for example, metal molds having a movable mold surface, heated to the fusing temperature, and pressed into a composite assembly. The stacked and fused multiple fiber unit is then sliced transversely across the fibers into wafers, and the resultant wafers form the multiple cell substrate of this invention, with the fibers forming the cores 12 and the matrix forming the cladding 14.

The transverse surface 15 of the substrate 10 thus produced is polished by means known in the optics art to a high surface finish.

The glass constituents making up the cores 12 and the cladding 14 are selected from glasses having different etching properties, so that portions of the substrate may be removed by selective etching thereof. For example, the fibers which ultimately form the cores 12 may comprise one of the lanthanum silicate glasses which are readily chemically etched with nitric acid. A suitable lanthanum silicate glass for this purpose can comprise the following:

| | Percent by wt. |
|---|---|
| $SiO_2$ | 12 |
| BaO | 47 |
| $B_2O_3$ | 18 |
| $ThO_2$ | 10 |
| $LaO_3$ | 10 |
| Iron and aluminum oxides | 3 |

A glass not etched by nitric acid and suitable for the cladding 14 can comprise, for example:

| | Percent by wt. |
|---|---|
| $SiO_2$ | 80.6 |
| $B_2O_3$ | 13 |
| $Na_2O$ | 3.8 |
| $K_2O$ | 0.4 |
| $Al_2O_3$ | 2.2 |

Although glass is specifically referred to hereinabove as the material making up the constituents of the substrate 10, various other materials having different etching properties may be used if so desired. For some uses, however, it is essential that the constituents have all the characteristics of polished glass, that is, an extremely smooth surface finish which is flat both in the microscopic and macroscopic sense. Optical flatness specifications such, for example, as fringe counts etc. may thereby be applied to the surface finish. Additionally, on a microscopic and submicroscopic scale, the surface smoothness with glass is of a much higher quality than would be possible with any metal, plastic, or other non-vitreous substance.

Figure 3:
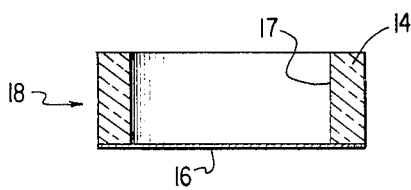
FIGURE 3 is a view similar to FIGURE 1 showing the cell of FIGURE 1 during another phase in the fabrication thereof.

With the substrate 10 prepared as set forth above, the polished surface 15 is coated to form a supported membrane 16 (FIGURE 3). The specific processes of coating and the various materials which may be utilized are described in greater detail in copending application of William L. Gardner, Ser. No. 673,571, filed Oct. 9, 1967, entitled Fabricating Thin Films and Membranes. For the purposes of this invention, the membrane 16 is formed of a substance having suitable light reflecting properties, preferably from a glass or vitreous material having etching properties similar to that of the material of the cladding 14, e.g., resistant to etching by nitric acid. The glass is preferably deposited on the substrate 10 by utilizing a a radio frequency plasma sputtering unit in accordance with a newly improved technique described in the aforesaid copending application.

After depositing the coating 16 to the thickness desired for the application or use to which the device is to be put, the core 12 (FIGURE 1) is removed by etching, thereby forming the cell indicated generally at 18, shown in FIGURE 3, which comprises the cladding 14 disposed in a supporting relationship to the coating 16 which now comprises a free-standing membrane over a recess 17 formed by removal of the core.

Figure 5:
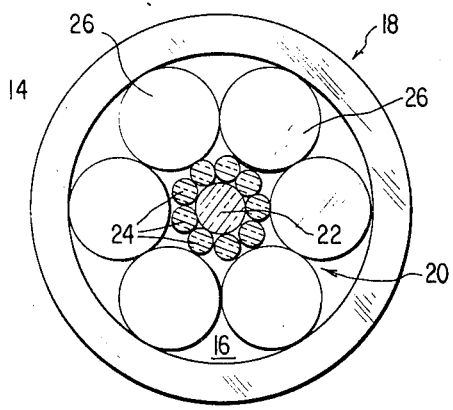
FIGURE 5 is a sectional view of the cell of FIGURE 4 taken along the line 5—5 thereof.
Figure 4:
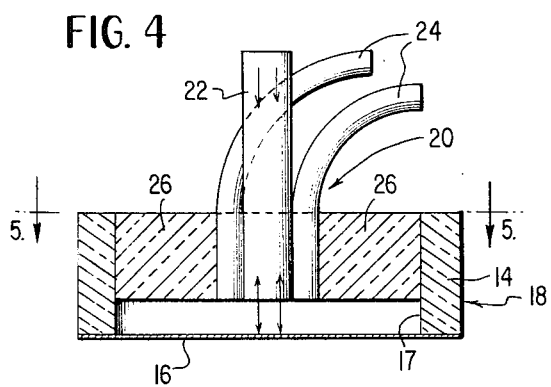
FIGURE 4 is an enlarged view similar to FIGURE 1, showing a completed cell in accordance with the invention.

Referring now more particularly to FIGURES 4 and 5, a bundle of glass fibers, shown generally at 20, is connected to the cell 18. The bundle comprises a centrally located first light transmitting optical fiber 22 surrounded by a plurality of reflected light receiving or second optical fibers 24 which are, in turn, further surrounded by a plurality of third fibers 26 (remaining portions shown in the figure) connecting the bundle to the walls of the recess 17. As best seen in FIGURE 4, the above-described fibers terminate in the cell 18 at a point spaced from the surface of the membrane 16 so that the membrane may deflect under the influence of pressure.

The fibers 22 and 24 are fabricated in accordance with methods known in the fiber art and preferably methods such as that disclosed in United States Patent No. 3,146,082, issued Aug. 25, 1964, to Hicks. In that patent, a glass rod is provided with a glass coating having a lower index of refraction than that of the rod. As set forth in that specification, compositions suitable for the high index of refraction glass rods are as follows (percentages by weight):

(a)

| | Percent |
|---|---|
| SiO | 44.9 |
| $Na_2O$ | 0.5 |
| $K_2O$ | 8 |
| PbO | 46.6 |

(b)

| | Percent |
|---|---|
| $SiO_2$ | 43.3 |
| $Na_2O$ | 0.7 |
| $K_2O$ | 7.5 |
| PbO | 32.6 |
| BaO | 10.8 |
| ZnO | 5.1 |

The coating can comprise glasses having the following typical compositions (percent by weight):

| | Percent |
|---|---|
| $SiO_2$ | 73.6 |
| $Na_2O$ | 16 |
| $K_2O$ | 0.6 |
| CaO | 5.2 |
| MgO | 3.6 |
| $Al_2O_3$ | 1 |

Each of the fibers 22 and 24 can further comprise bundles of the aforedescribed single-clad fibers formed as a unit by fusing the cladding as further described in the latter-mentioned patent, or can comprise single fibers as is dictated by the particular use, size, and characteristics of the device for which the invention is intended. The fibers 22 and 24 are preferably flexible for purposes to be described in greater detail below.

The fibers 26 serve primarily to fix and mechanically center the fibers 22 and 24 in the recess 17. Means, other than the fibers 26 can be utilized for this purpose if so desired.

In a preferred method of fabrication, the bundle 20 is introduced into the cell 18 as follows:

Utilizing the above-described technique, the fibers 22, 24 and 26 are formed as a conduit, bound by a matrix of material having different etching properties than the material of the aforedescribed fibers. In this instance, the spaces formed between the various fibers as seen in FIGURE 5 would initially comprise the binding matrix for the fibers. The conduit is then cut to length and the ends thereof suitably finished by optical polishing techniques and inserted into the recess 17 of the cell 18 in spaced relationship to the membrane 16 as seen in FIGURE 4. The inserted portion conduit is then fused or otherwise adhered to the cell 18 and the matrix is dissolved by etching externally of the cell leaving the individual fibers free. The fibers are then segregated according to their size and the extending portions of the fibers 26 are cut away as seen in FIGURE 4. The light transmitting fiber 22 is connected to a source of external light for transmission of collimated light to the membrane as shown by arrows in FIGURE 4. The fibers 24 are connected to a light detecting device (not shown) for conversion of light signals transmitted therethrough into a displayable form. The display may be converted, for example, into an audible state or may be calibrated directly in terms of pressure, or simultaneously, the pressure and sound may be monitored.

In operation, collimated light is transmitted by the fiber 22 for reflection from the membrane 16. In FIGURE 4, with the membrane undeflected in the absence of pressure, the light is reflected, as indicated by the arrows, directly back into the fiber 22. Light picked up and transmitted by the fibers 24 is at a minimum, thereby generating a minimum signal at zero pressure conditions.

Figure 6:
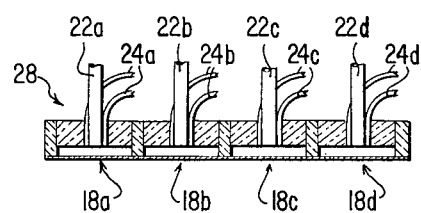
FIGURE 6 is a view similar to FIGURE 4 showing the cell thereof in an operational phase.

Referring now to FIGURE 6 of the drawings, pressure acting on the membrane 16 deflects it upwardly. In this condition, light transmitted through the fiber 22 is reflected from the convex surface, formed by the deflected membrane 16, outwardly toward the fibers 24 as indicated by the arrows. The reflected light is then transmitted through the fibers 24 to the light detecting device, the intensity thereof corresponding to the deflection of the diaphragm, thereby providing an indication of the pressure, intensity and/or a continuing indication of varying pressure values according to the level of light received by the sensing device.

Figure 7:
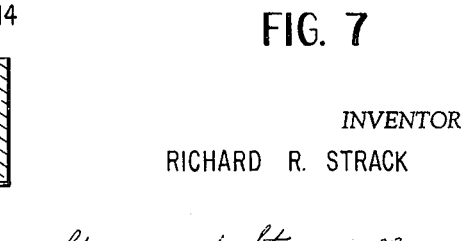
FIGURE 7 is a reduced sectional view showing a device comprising multiple cells in accordance with the invention.

Referring to FIGURE 7, a plurality of cells 18a through 18d are shown in a multi-cell transducer indicated generally at 28. This cell is preferably formed in accordance with the complex glass fiber techniques set forth in the above description of the substrate formation. In this arrangement, the respective fibers 22a through 22d can be connected to single or multiple sources of light, as desired. The fibers 24a through 24d may be connected to single or multiple light detecting devices. In the former case, with a single light detecting device, the pressure over a large area may be sensed and/or averaged while, in the latter case, the pressure profile over an area can be monitored.

Refinements in the sensitivity of the device are possible by altering the basic light conveying mechanism by means such, for example, as altering the angle of introduction and pickup of light from the membrane 16.

What has been set forth above is intended primarily as exemplary to enable those skilled in the art in the practice of the invention. It should, therefore, be understood that, within the scope of the appended claims, the invention may be practiced other than specifically described. What is new and therefore desired to be protected by Letters Patent of the United States is:

What is claimed is:

1. The method of fabricating a pressure transducer comprising the steps of:

forming an edge supported diaphragm by:

(a) fabricating a substrate consisting of at least one core encased by a matrix of material having etching properties different than the material of said core;
(b) polishing a transverse surface of said substrate;
(c) depositing a coating on said polished surface; and removing said core from said matrix by chemical etching thereof to form a recess in said matrix with said coating forming a free standing membrane thereover; and and disposing a light transmitting and reflected light receiving device in spaced relationship to said membrane for detecting deflection thereof by sensing deflection of light reflected therefrom.

2. A method in accordance with claim 1 wherein said light transmitting and reflected light receiving device is fabricated by forming an optical fiber bundle comprising a matrix binding a first centrally located light transmitting optical fiber surrounded by second light transmitting optical fibers and inserting said bundle into said opening in said matrix in spaced relation to said membrane.

3. A method in accordance with claim 2 further comprising the steps of etching the matrix from said bundle and connecting said first fiber to a source of light; and connecting said second fibers to a light intensity sensing means.

4. A method in accordance with claim 3 wherein said bundle further comprises a plurality of third fibers surrounding said second fibers and configured to engage the walls of said recess and support said first and second fiber therein, wherein the method further comprises the steps of inserting said bundle in said recess, connecting said third fibers to the walls of said recess, and severing said third fibers in a plane coincident with the uncoated transverse surface of said substrate.

References Cited

UNITED STATES PATENTS

| | | | |
|---|---|---|---|
| 2,806,958 | 9/1957 | Zunick. | |
| 2,995,970 | 8/1961 | Hicks et al. | 65—23 |
| 3,265,480 | 8/1966 | Hicks | 65—31 X |
| 3,275,428 | 9/1966 | Siegmund | 65—23 |
| 3,319,318 | 5/1967 | Taimuty | 29—423 X |

JOHN F. CAMPBELL, Primary Examiner

D. C. REILEY, Assistant Examiner

U.S. Cl. X.R.

29—594, 595; 65—23, 31; 73—406